United States Patent [19]

West

[11] 4,131,553

[45] Dec. 26, 1978

[54] ALKYLBENZENE SULFONIC ACID MODIFIED MANNICH REACTION PRODUCTS FROM OXIDIZED POLYMERS

[75] Inventor: C. Thomas West, Naperville, Ill.

[73] Assignee: Standard Oil Company (Indiana), Chicago, Ill.

[21] Appl. No.: 877,874

[22] Filed: Feb. 15, 1978

[51] Int. Cl.² .................. C10M 1/40; C10M 3/34; C10M 5/22; C08G 12/04
[52] U.S. Cl. .................................. 252/33; 526/33; 526/19
[58] Field of Search ................. 252/33; 260/72 R

[56] References Cited

U.S. PATENT DOCUMENTS

| | | | |
|---|---|---|---|
| 3,872,019 | 3/1975 | Culbertson et al. | 252/51.5 R |
| 3,919,094 | 11/1975 | Schiff | 252/33 |
| 4,011,380 | 3/1977 | West et al. | 252/51.5 R |

*Primary Examiner*—Irving Vaughn
*Attorney, Agent, or Firm*—Mark J. DiPietro; Arthur G. Gilkes; William T. McClain

[57] ABSTRACT

This invention provides a process for and products of the Mannich condensation reaction of oxidized olefinic polymers. The Mannich reaction is carried out in the presence of about 0.01 to 40.0% by weight of an oil soluble sulfonic acid based on the neat polymer. The sulfonic acid improves the properties of the oxidized oil soluble Mannich reaction product and catalyzes the Mannich condensation reaction.

5 Claims, No Drawings

ALKYLBENZENE SULFONIC ACID MODIFIED MANNICH REACTION PRODUCTS FROM OXIDIZED POLYMERS

Oxidized polymers have found a number of applications, one of which is an intermediate for Mannich type derivatives of oxidized polymers used in lubricating oil. These Mannich type additives display both detergency and viscosity index improvement. Lubricant deterioration in engines causes the formation of lacquer, sludge, and carbon deposits on the interior surfaces of the engines. This foreign matter accelerates wear and reduces engine efficiency. The tendency for such injurious products to deposit on surfaces of engines is reduced by the incorporation in the lubricating oil of additives having dispersancy and detergency properties. The continuing search for and the necessity for having available ashless dispersants and detergent additives for motor oils is well known. Since the requirements of greater fuel economy and lower emissions from internal combustion engines has arisen, a greater demand exists for improved additives.

It is also well known that lubricating oils become thin at elevated temperatures while thickening at low temperatures. Generally certain additives improve lubricant oil temperature viscosity relationships. In the case of crankcase lubricants, the oil must not become so thick when cold that the engine is prevented from operation. At the same time, when the engine has heated up in operation, the oil must remain sufficiently viscous to maintain oil films for lubrication of moving parts. Various additives provide both detergent and viscosity index improvement to lubricants.

Culbertson, et. al., U.S. Pat. No. 3,872,019 issued Mar. 18, 1975, discloses and claims bifunctional lubricant additives exhibiting both dispersant and viscosity index improving properties obtained by the Mannich condensation of an oxidized long chain, high molecular weight amorphous copolymer of essentially ethylene and propylene having a number average molecular weight of at least about 10,000 and at least 140 pendant methyl groups per 1,000 chain carbon atoms with a formaldehyde yielding reactant and a primary or secondary amine or polyamine, said reactants being employed in the molar ratio of from about 1:2:2 to about 1:20:20, respectively.

West, et al., U.S. Pat. No. 4,011,380 issued Mar. 8, 1977, discloses and claims oxidation of polymers of ethylene and olefinic monomers in the temperature range of from about −40° F. to about 800° F. The oxidation is carried out in the presence of about 0.05 wt.% to about 1.0 wt.% based on the copolymer oil solution, of an oil soluble benzene sulfonic acid or salt thereof. These benzene sulfonic acids enhance the rate of oxidation reaction and often lighten the color of the oxidized product.

If the oxidized copolymer of the West patent contains an excess of the amount of oil soluble sulfonic acid needed to enhance the oxidation, providing oil-soluble sulfonic acid catalysis for the Mannich reaction, the resulting product is dark having a color greater than about 8 and therefore undesirable. If, however, the oil soluble sulfonic acid which is to act as a Mannich reaction catalyst is added after the oxidation is complete, the products of the Mannich reaction remain substantially lighter having a color about 3.5.

The general object of the invention is to provide a catalyst for the reaction to promote the fullest reaction of potential sites on the oxidized copolymer molecule. Another object is to provide a process for a Mannich copolymer viscosity index improving additive with the highest detergent/dispersant activity and lightest color.

I have discovered that oil soluble sulfonic acid catalyzes the Mannich reaction and enhances the additive lubricant properties. The sulfonic acid must be added during the Mannich condensation reaction of the oxidized copolymer, at the same time as, or after the addition of the amine. The sulfonic acid catalyzes the reaction producing the Mannich modified oxidized polymer, increases the resistance of the Mannich modified oxidized polymer to oxidation and varnish formation, increases the detergent-dispersing properties of the viscosity-index improver, does not appreciably harm the color of the product and increases the performance of the additive in engine tests. The Mannich reaction may be carried out with polymer oxidized in the absence of oil soluble sulfonic acids.

Briefly, sulfonic acid modified Mannich reaction products of this invention can be produced by reacting the oxidized copolymer, the amine, and formaldehyde yielding reagent, in the presence of an alkyl benzene sulfonic acid at a temperature of about 250°–350° F. and recovering the resulting reaction product. In the preparation of the additive, the Mannich condensation reaction can be conducted using a non-reactive solvent such as aromatic or aliphatic hydrocarbons, or lubricant oils. Further details of the Mannich condensation reaction are found in Culbertson, et al., U.S. Pat. No. 3,872,019, which is expressly incorporated by reference herein. To prevent contaminating formation of resin-like solids and to prevent unwanted viscosity increase, a phenolic compound can be added as disclosed in a copending application Ser. No. 877,875 filed Feb. 15, 1978.

The term "olefinic" polymer as used herein and in the claims refers to amorphous addition polymers or copolymers derived from olefinically unsaturated monomers or mixtures thereof. Such olefin monomers include olefins of the general formula $R-CH=CH_2$, in which R is hydrogen, an aliphatic or cycloaliphatic radical of from 1 to about 20 carbon atoms, for example, propene, isobutylene, 1-butene, 1-hexane, 4-methyl-1-pentene, and 1-decene. Other olefin monomers having a plurality of double bonds may be used, in particular di-olefins containing from about 4 to about 25 carbon atoms, e.g., 1,3-butadiene, 1,4-hexadiene, 1,4-pentadiene, 2-methyl-1,5-hexadiene, 1,7-octadiene, 5-methylene-2-norbornene, norbornadiene, etc.

Suitable ethylene, propylene copolymers contain about 20 to about 65, preferably from about 35 to about 45 mole percent propylene having a number average molecular weight of at least 20,000, i.e., from about 20,000 to about 200,000 or more, and preferably from about 20,000 to about 70,000 and contain at least 100 pendant methyl groups per 1,000 chain carbon atoms.

A particularly suitable ethylene-propylene copolymer is one having the following characteristics:

| | | |
|---|---|---|
| Number Average Molecular Weight | 25,000–35,000 | |
| Percent (Molar) Propylene Monomer | 38–42 | |
| Pendant Methyl Groups per 1,000 Chain Carbon Atoms | 160–170 | |
| Inherent Viscosity | 1.7–2.0 | (A) |
| Gardner Viscosity | U–V | (B) |

| | | |
|---|---|---|
| -continued | | |
| Mooney Viscosity | 20-35 | (C) |

(A) 0.1 gram copolymer in 100 cc decalin at 135° C.
(B) 8.0% copolymer if toluene at 25° C.
(C) ASTM D-1646.

Methods of preparation of the copolymers are well known. Such methods are described in many U.S. patents, e.g., U.S. Pat. Nos. 2,700,633; 2,725,231; 2,792,288; 2,933,480; 3,000,866; 3,063,973; 3,093,621, and others.

The polymer used in this invention must be oxidized. The oxidation can be accomplished by contacting the copolymer under suitable conditions of temperature and at atmospheric or elevated pressures with an oxidizing agent such as air or free oxygen or any oxygen containing material capable of releasing oxygen under these conditions. If desired, the oxidation can be conducted in the presence of known oxidation catalysts such as platinum or platinum group metals and compounds containing metals such as copper, iron, cobalt, cadmium, manganese, vanadium, etc. The oxidation can be carried out by methods described in U.S. Pat. Nos. 2,982,728; 3,316,177; 3,153,025; 3,865,499; and 3,544,520.

Generally, the oxidation can be carried out over a wide temperature range, depending upon the oxidizing agent used; for example, with an active oxidizing agent, e.g., $SO_3$, temperatures in the range of $-40°$ F. to $400°$ F. have been used, while with less active oxidizing agents, e.g., air, temperatures in the range of $100°-800°$ F. have ben used. The copolymers are generally dissolved in oil prior to the oxidation. Further, depending upon the rate desired, the oxidation can be conducted at sub-atmospheric, atmospheric or super-atmospheric pressures, and in the presence or absence of oxidation catalysts. The conditions of temperature, pressure, oxygen content of the oxidizing agent, the rate of introducing the oxidizing agent, the catalyst employed, if any, etc., are correlated and controlled, by those skilled in the art, so as to obtain the desired optimum results.

The following illustrates a preferred method of oxidizing a polymer. To a copolymer of ethylene and propylene (1 part), having a number average molecular weight of about 28,000, was added a solvent-extracted SAE 5W mineral oil (9 parts) in an open reaction vessel, and the mixture slowly stirred and heated at a temperature of 360° F., under an inert gas atmosphere, until the solution of the rubber-like polymer in the solvent was affected. Maintaining the 360° F. temperature, the mixture was rapidly agitated in an atmosphere composed of 50 percent air and 50 percent nitrogen, to promote the oxidation of the copolymer. A 50:50 air:nitrogen ratio was used to preclude the possibility of an explosive mixture being formed. Reaction in the described manner was continued for 2.5-4.0 hours. About 5-50 oxygen atoms per molecule of the copolymer were introduced under such oxidation conditions.

Some of the sulfonic acids which can be used have the general formula:

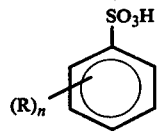

where R is alkyl, aryl, or hydroxy, chloro or bromo substituted hydrocarbyl; and n is an integer of 1-5. In some cases the R group can be made by polymerizing $C_2-C_6$ olefins to a molecular weight in the range of about 80 to about 100,000, preferably about 80 to about 1,000, and then attaching said group to a benzene ring by well known alkylation techniques.

R can be any hydrocarbon or subsituted hydrocarbon which results in an oil-soluble benzene sulfonic acid. R can be of a low molecular weight alkyl with greater than 9 carbon atoms such as nonyl, decyl, dodecyl, and the like with a molecular weight of about 120; an intermediate molecular weight hydrocarbyl such as polybutylene or polypropylene polymers with 15 to 1000 carbon atoms with a molecular weight at least 200; a high molecular weight hydrocarbyl such as polyolefin having a number average molecular weight of 100,000; and others. R can be substituted with groups such as chlorine, bromine or hydroxy groups. Also, the benzene ring of the sulfonic acid may have more than one substituent alkyl or hydroxy or halo alkyl group.

Other suitable oil-soluble benzene sulfonic acids are the oil-soluble petroleum sulfonic acids, commonly referred to as "mahogany acids," of about 350 to 750 molecular weight, aryl sulfonic acids, and alkaryl sulfonic acids. Illustrative of such sulfonic acids are dilauryl benzene sulfonic acid, lauryl cetyl benzene sulfonic acid, paraffin-substituted benzene sulfonic acids, polyolefin alkylated benzene sulfonic acids, such as polybutylene alkylated benzene sulfonic acids in which the polybutylene substituents have molecular weights of at least about 100, and preferably within the range of from about 100 to about 100,000, polypropylene alkylated benzene sulfonic acids in which the polypropylene substitutents have a molecular weight of at least about 80 and up to 100,000, preferably in the range of 200 to 1200. Examples of other suitable sulfonic acids are dipa-raffin wax-substituted phenol sulfonic acids, cetyl chlorobenzene sulfonic acids, cetyl-phenol disulfide sulfonic acids, cetyl-phenol monosulfide sulfonic acids, cetoxy capryl benzene sulfonic acids. Other suitable oil-soluble sulfonic acids are well described in the art, such as for example U.S. Pat. No. 2,616,604; U.S. Pat. No. 2,626,207; and U.S. Pat. No. 2,767,209, and others. A most important consideration in selecting an R group is that the final substituted compound be oil soluble. Low molecular weight sulfonic acids are preferred. The low cost and high activity of the low molecular weight of the alkyl benzene sulfonic acids are desirable characteristics.

The formaldehyde used in the Mannich reaction can be produced from any common formaldehyde yielding reagent. Examples of formaldehyde yielding reagents are formalin, paraformaldehyde, other linear and cyclic formaldehyde polymers, gaseous formaldehyde and the like.

The amine reactant used in the preparation of the products of the present invention are primary and secondary aliphatic amines and diamines of the general formula $NH_2(CH_2)_yNH_2$, wherein y is an integer of 3 to about 12 and amines and diamines containing up to about 10 carbon atoms in the alkyl group, the polyalkylene polyamines of the general formula:

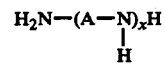

wherein A is a divalent alkylene radical of about 2 to about 6 carbon atoms, and X is an integer from 1 to about 10. Illustrative of such suitable amines are: methylamine, dibutylamine, cyclohexylamine, propylamine, decylamine, ethylenediamine, trimethylenediamines, tetramethylenediamine, hexamethylenediamine, diethylenetriamine, triethylenetetramine, tetraethylenepentamine, tripropylenetetramine, tetrapropylenepentamine, and other polyalkylene polyamines in which the alkylene group contains up to about 12 carbon atoms.

An infrared spectroscopy method is used to measure the completeness of the reaction used to produce the Mannich additive. A measurement of the 1680 $cm^{-1}$ adsorption of the Mannich additive which is about 0.220 per 0.5mm cell path length indicates complete reaction and best additive properties, as determined by engine test values.

In greater detail, the Mannich reaction is carried out with an amine, a formaldehyde yielding reagent, a copolymer oxidized, the presence or absence of sulfonic acid, and an oil soluble sulfonic acid in an amount of about 0.01 to 40.0 weight percent sulfonic acid based on the neat polymer. A wide variety of such sulfonic acids operate to catalyze the reaction. The functional group of the oil soluble sulfonic acid which provides the important catalytic properties is the sulfonic acid group.

The following illustrates a preferred method of conducting the Mannich condensation reaction with an oxidized polymer and the sulfonic acid catalyst. 100 parts of the oxidized copolymer in 1000 parts of SAE 5W mineral oil diluent was heated to 320° F. under a nitrogen blanket. 0.4 parts of solid paraformaldehyde and 0.75 parts of molten hexamethylene diamine and 1.0 part of an alkyl benzene sulfonic acid having a molecular weight of about 600 in a 39.0% by weight oil solution, are simultaneously added to the stirred reaction mixture at a temperature of 320° F. under a nitrogen blanket. The reaction was continued for 2 hours liberating water until complete. The mixture was stripped with nitrogen at 320° F. to remove water and other volatile byproducts. After filtration the mixture was clear.

The Mannich reaction is believed to occur between the active acidic protons on carbon atoms alpha to the carbonyl functions produced during the oxidation. Secondary reactions occur between the active reactants, carbonyl groups, and Mannich nitrogen atoms producing many varied crosslinked and aminated compounds. The active acidic protons react with formaldehyde and the amine. This introduces a detergent dispersant function in the polymer viscosity index improver additive.

The Mannich condensation reaction of the oxidized copolymers carried out in the presence of about 0.01 wt.% to about 40 wt.%, preferably from about 0.10 wt.% to about 2 wt.% based on the polymer of an oil soluble sulfonic acid. As can be seen, a wide variety of such oil soluble sulfonic acids operate to increase the dispersancy detergent effect of the Mannich sulfonic acid copolymer product and the reaction rate producing the additive.

A limitation in the order of addition of the reactants is that the sulfonic acid must not be added prior to the amine. Sulfonic acid added to the oil-oxidized polymer prior to the amine rapidly decomposes, darkening the oil. The sulfonic acid when added after the amine, reacts with the amine. The acid is neutralized and stabilized preventing decomposition of the acid. Following the amine addition the course of the reaction is arbitrary.

The chemical composition of the reaction product of the oxidized polymer, the amine, the formaldehyde yielding reagent and a sulfonic acid cannot be characterized with precise chemical formulas. The oxidation of the polymer produces predominantly carbonyl groups, although a minor amount of aldehyde, acid and perhaps ester may also be present in the polymer chain. In view of the complex nature of the oxidized reaction product, the precise composition, reaction sites, and final structure of such product cannot be defined by a conventional chemical structure but rather must be defined purely through method of preparation and product properties. Chemical reactants which are added at different steps in the production beginning with the polymerization of the copolymer and ending with the Mannich condensation reaction, produce useful compounds when added to the reaction at different steps. The reaction sites of the various chemical additives vary with the step in which the various chemical reactants are added. Therefore, a reactant added during the polymerization will produce unique effects on the chemical and physical properties of the polymer. Reactants which are added during the oxidation of the polymer and during the Mannich condensation reaction will produce different but unique effects. West, et al., U.S. Pat. No. 4,011,380, claims the use of a sulfonic acid or acid salt to promote oxidation of the copolymer. During the oxidation of the copolymer, the sulfonic acid appears to be chemically altered. The Mannich reaction catalysis occurs to some extent using copolymer oxidized in the presence of excess sulfonic acid. However, in the Mannich reaction the color of the product is very dark when the oil soluble sulfonic acid is added only to the oxidation reaction mixture.

The described reaction products of the present invention are effective dispersant and viscosity index improving additives in lubricant compositions when used in amounts from about 0.1 to about 10 percent based on neat copolymer.

Suitable lubricating base oils are mineral oils, petroleum oils, synthetic lubricating oils such as those obtained by the polymerization of hydrocarbons, and other well known synthetic lubricating oils, and lubricating oils of animal or vegetable origin. Concentrates of a suitable oil base contaiing more than 10 per cent, that is of about 10 wt.% alone or in combination with other well known additives, can be used for blending with the lubricant oils in proportions desired for particular conditions or used to give finished products containing from about 0.1 to about 10% of bifunctional additives of this invention.

EXAMPLE I

A. Oxidation of the Copolymer 7.0 grams of one ethylene-propylene (about 40 mole percent propylene) copolymer molecular weight about 30,000 in 100 grams of 5W 100 N oil was placed in a flask fitted with a stirrer and means to sparge a 50/50 mixture of air and nitrogen through the contents. A 0.14 gram portion of an overbased magnesium polypropyl benzene sulfonate, molecular weight about 900, oxidation catalyst was added and the flask was heated to 395° F. Nitrogen and air were bubbled through the mixture until oxidation and polymer degradation reduced the viscosity of the mixture to about 2100 Saybolt Universal Seconds at 210° F. The reaction was complete in 2½ hours and then cooled to room temperature.

B. The Mannich Reaction 0.42 grams of hexamethylene diamine (0.0036 moles), 0.82 grams of a 39.5% in oil solution of polypropyl benzene sulfonic acid (0.0036 mole) Mannich reaction catalyst, molecular weight about 900, and 0.50 gm formalin (44 percent) (0.0073 moles) were added to 100 grams of the 7 percent by weight oil solution of the oxidized copolymer at 390° F. The mixture was maintained at 390° F. and the reaction was continued for 1 hour. The mixture was sparged with nitrogen at 390° F. for one hour.

EXAMPLE II

Example 1A was repeated with the addition of 0.66% by weight based on the polymer oil solution of a 45.0% by weight based on the oil of solution of a polypropyl benzene sulfonic acid equivalent weight 807 in place of the 0.15 gm of the magnesium sulfonate. In 1B no additional sulfonic acid was added.

EXAMPLE III

Example I was repeated with the mole ratio of formalin to hexamethylene diamine 1:1.

EXAMPLE IV

Example 1 was repeated except with a mole ratio of formalin to hexamethylene diamine of 1.5:1.

EXAMPLE V

Example 1 was repeated with 0.68 grams of alkyl benzene sulfonic acid (0.0003 mole) and the ratio of formalin to hexamethylene diamine is 1.5:1.

EXAMPLE VI

Example 1 was repeated except with 0.68 grams of alkyl benzene sulfonic acid (0.0003 mole) and the mole ratio of formalin to hexamethylene diamine was 2:1.

EXAMPLE VII

Example 1 is repeated with 0.68 grams of alkyl benzene sulfonic acid (0.0003 mole) and the mole ratio of formalin to hexamethylene diamine was 1:1.

EXAMPLE VIII ;p Example 1 was repeated except 0.68 grams alkyl benzene sulfonic acid (0.0003mole) was used and the mole ratio of formalin to hexamethylene diamine was 3:1.

EXAMPLE IX

Example 1 was repeated except with the formalin to hexamethylene diamine ratio of 1:1 without the alkyl benzene sulfonic acid.

EXAMPLE X

Example 1 was repeated except with the formalin to hexamethylene diamine ratio of 2:1 without the alkyl benzene sulfonic acid.

EXAMPLE XI

A. Oxidation of the Copolymer 70 grams of an ethylene-propylene copolymer which is about 40 mole percent propylene and has a molecular weight of about 30,000, in 1000 gms of 100N oil was placed in a flask fitted with a stirrer and means to blow a 50/50 mixture of air and nitrogen through the contents. 1.5 grams of an overbased magnesium polypropyl benzene sulfonate, molecular weight about 900, oxidation catalyst was added and the flask is heated to 395° F. Nitrogen and air were bubbled through the mixture until oxidation and polymer degradation reduced the viscosity of the mixture to about 2100 Saybolt Universal Seconds at 210° F. The reaction was complete in 2½ hours, and then cooled to room temperature.

B. Mannich Reaction

To 200g of a 7.0 wt. % oxidized ethylene-propylene copolymer in oil solution at 360° F. was added 1.27g of hexamethylene diamine (0.011 moles), 2.0g. of 45.0 wt. % polypropyl benzene sulfonic acid in oil solution (molecular weight about 665) (0.0014 moles), 1.64 of 37.0 wt. % aqueous formaldehyde (0.02 moles) and 1.08g of phenol (0.013 moles). The reaction is allowed to continue for 1 hour and the product is stripped of volatiles with nitrogen at 360° F. for 1 hour.

These experiments were carried out with polymer oxidized in the presence of the magnesium polybutyl benzene sulfonate. The results of the following tests point out the absence of the desired increase in performance when the sulfonate oxidized polymer is reacted in a Mannich process without a sulfonic acid Mannich catalyst. The increased performance is attained only when the sulfonic acid is added during the Mannich reaction. The sulfonate present during the oxidation step does not inherently produce the desired Mannich reaction catalysis.

The spot Dispersancy Test gives a measure of the oil's ability to disperse sludge and varnish. In the Spot Dispersancy Test, a dispersant is mixed with an amount of Ford VC sludge oil and is incubated at 300° F. for 16 hours and 3–10 drops of this mixture are dropped onto a standard white blotter paper producing a sludge-oil spot. The sludge-oil spot separates into a sludge spot and an oil spot. After 24 hours, the diameter of the sludge and the oil rings are measured. Dispersancy is reflected by the ability of an oil to keep sludge in suspension. Thus, dispersancy will be reflected by the difference in diameters of the sludge and oil rings. A rating (SDT Rating) is given by the diameter of the sludge ring divided by the diameter of the oil ring, and multiplied by 100. A high numerical rating indicates good dispersancy.

The hot tube test is a determination of the oxidation and varnish resistant properties of an oil package. A measured quantity of oil is metered into a 2mm heated glass tube through which hot air or nitrogen dioxide is blown through the tube. The oil is consumed in the test and the deposits in the tube are measured. The tubes are rated from zero through ten. Zero being a heavy black opaque deposit, and 10, perfectly clean.

TABLE I

| | EFFECT OF SULFONIC ACID AND FORMALDEHYDE TO HEXAMETHYLENE DIAMINE RATIO ON BENCH TEST PERFORMANCE | | | | | |
|---|---|---|---|---|---|---|
| Example | Mole Equivalents of Sulfonic Acid | HCHO/HMDA Ratio | R* | Spot Dispersancy Test | Hot Tube Test Air | $NO_x$ |
| I | 0.10 | 2.0 | 0.22 | 83 | 2.5 | 1.5 |

TABLE I-continued
EFFECT OF SULFONIC ACID AND FORMALDEHYDE TO HEXAMETHYLENE DIAMINE RATIO ON BENCH TEST PERFORMANCE

| Example | Mole Equivalents of Sulfonic Acid | HCHO/HMDA Ratio | R* | Spot Dispersancy Test | Hot Tube Test Air | Hot Tube Test NO$_x$ |
|---------|-----------------------------------|-----------------|------|----------------------|-------------------|----------------------|
| II      | 0.10                              | 2.0             | 0.18 | 83                   | —                 | —                    |
| III     | 0.10                              | 1.0             | 0.05 | 59                   | 3.5               | 1.8                  |
| IV      | 0.10                              | 1.5             | 0.16 | 86                   | 3.5               | 2.0                  |
| V       | 0.083                             | 1.5             | 0.17 | 88                   | —                 | —                    |
| VI      | 0.083                             | 2.0             | 0.22 | 83                   | —                 | —                    |
| VII     | 0.083                             | 1.0             | 0.06 | 59                   | —                 | —                    |
| VIII    | 0.083                             | 3.0             | 0.24 | 86                   | —                 | —                    |
| IX      | 0.0                               | 1.0             | 0.10 | 55                   | 2.7               | 1.6                  |
| X       | 0.0                               | 2.0             | 0.13 | 60                   | 3.5               | 1.5                  |

Table I demonstrates the use of the sulfonic acid catalyst and high mole ratios of HCHO/HMDA produces a superior additive.
*IR 1660–1680 cm$^{-1}$ a per 0.5 mm cell path length.

TABLE II
ASTM PRODUCT COLOR**

| Example | Color |
|---------|-------|
| I       | 3.5   |
| II      | greater than 8 |

**diluted to 15% by weight in xylene

TABLE III
Test Oil Compositions

| | Wt. % | | | | | |
|---|---|---|---|---|---|---|
| | I | II | III | IV | V | VI |
| Dispersant Mannich (Polybutyl Phenol; Formaldehyde; Hexamethylene Diamine) | 4.0 | 4.0 | 3.5 | 2.5 | 3.6 | 3.5 |
| Inhibitors (Zinc Dialkyl Dithiophosphate) | 1.5 | 1.5 | 0.8 | 1.6 | 1.6 | 0.8 |
| Overbased Magnesium polypropyl Benzene Sulfonate | 0.8 | 0.8 | 0.5 | 1.0 | 1.0 | 0.5 |
| Calcium Polypropyl Benzene Sulfonate | 1.0 | 1.0 | 2.5 | — | — | 2.5 |
| Overbased Calcium Bis (Alkyl Phenol) | 1.5 | 1.5 | 1.2 | 0.90 | 0.90 | 1.2 |
| Isooctyl Phenoxy Tetraethoxy Ethanol | — | — | 0.1 | 0.90 | 0.9 | 0.1 |
| Sulfonic Acid Modified Mannich Copolymer Example I | 10.1 | — | 10.1 | 11.0 | — | — |
| Unmodified Mannich Copolymer Example X | — | 10.1 | — | — | — | 10.1 |
| Polymethacrylate Dispersant Viscosity Index Improver | — | — | — | — | 5.7 | — |
| SX-5, SX-10 Lubricant | Bal. | Bal. | Bal. | Bal. | Bal. | Bal. |

TABLE IV
120 Hour Cat 1-H Test
Sulfonate Modified Vs. Un-Modified Oil Compositions

| Test Oil Compositions | % TGF | WCD | WLD | WTD |
|-----------------------|-------|-----|-----|-----|
| II                    | 29    | 33  | 32  | 65  |
|                       | 32    | 38  | 39  | 77  |
| I modified with sulfonic acid | 11 | 24 | 28 | 53 |
|                       | 7     | 9   | 24  | 33  |

(low numbers indicate best performance)

TABLE V
192 Hour VC Test
Sulfonic Acid Modified Dispersant - VI Improver Vs. Polymethacrylate Dispersant

| Test Oil Compositions | Avg. Sludge | Avg. Sludge | Piston Varnish |
|-----------------------|-------------|-------------|----------------|
| V                     | 9.2         | 8.5         | 8.1            |
| IV modified with sulfonic acid | 9.1 | 8.4 | 7.9 |

(perfect score is 10; worst score is 0)

TABLE VI
120 Hour Cat 1-G Test
Sulfonic Acid Modified Vs. Un-Modified Polymer Oil Compositions

| Test Oil Compositions | % TGF | WCD | WLD | WTD |
|-----------------------|-------|-----|-----|-----|
| III                   | 47    | 56  | 27  | 83  |
| VI                    | 69    | 146 | 41  | 187 |

(low numbers indicate best performance)

These tables of data show the sulfonic acid modified Mannich polymer improved dispersancy, oxidation and varnish resistance, and improved engine test results in the 1-H and 1-G tests over nonsulfonic acid modified oxidized Mannich modified copolymer viscosity index improving dispersant. The sulfonic acid modified polymeric Mannich dispersantviscosity index improver had greater dispersancy at equal thickening than a commercial polymethacrylate dispersant-viscosity index improver.

I claim:

1. A process of producing a dispersant-viscosity index improver which comprises reacting:

a high molecular weight oxidized amorphous addition polymer with a formaldehyde yielding reagent, an amine selected from the group consisting of aliphatic primary and secondary amines having from about 2 to 12 carbon atoms, an aliphatic amine of the general formula NH$_2$[CH$_2$)$_z$NH)]$_x$H wherein z is an integer from about 2 to about 6 and x is an integer from about 1 to about 10, and about 0.01 to 40.0% by weight of an oil soluble sulfonic acid based on the copolymer, wherein the sulfonic acid is contacted with the oxidized polymer after the amine.

2. The process of claim 1 wherein the oil soluble sufficient acid is represented by the formula:

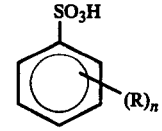

wherein R is an alkyl group with at least 9 carbons, and n is a number from 1–5.

3. The process of claim 2 wherein the oil soluble sulfonic acid was an alkyl group having a molecular weight from about 130 to about 1200.

4. The process of claim 1 wherein the oil soluble sulfonic acid is a polypropyl benzene sulfonic acid of a number average molecular weight from about 200 to about 1200.

5. A lubricant oil containing an effective amount of the product of the process of claim 1.

UNITED STATES PATENT OFFICE
CERTIFICATE OF CORRECTION

Patent No. 4,131,553     Dated December 26, 1978

Inventor(s) C. Thomas West

It is certified that error appears in the above-identified patent and that said Letters Patent are hereby corrected as shown below:

| Patent Col. | Line | |
|---|---|---|
| 2 | 46 | "1-hexane" should read -- 1-hexene -- |
| 3 | 4 | "if toluene" should read -- in toluene -- |
| 3 | 31 | "ben" should read -- been -- |
| 3 | 52 | "airnitrogen" should read -- air-nitrogen -- |
| 4 | 8 | "be of a" should read -- be a -- |
| 5 | 5-6 | "trimethylenediamines" should read -- trimethylenediamine -- |

UNITED STATES PATENT OFFICE
CERTIFICATE OF CORRECTION

Patent No. 4,131,553   Dated December 26, 1978

Inventor(s) C. Thomas West

It is certified that error appears in the above-identified patent and that said Letters Patent are hereby corrected as shown below:

| | | |
|---|---|---|
| 5 | 7 | "triethylenetetramine" should read -- triethylenetetraamine -- |
| 5 | 21 | "oxidized, the" should read -- oxidized, in the -- |
| 5 | 8 | "tripropylenetetramine" should read -- tripropylene tetraamine -- |
| 6 | 48 | "contaiing" should read -- containing -- |
| 7 | 6 | "(0.0036 mole)" should read -- (0.00036 mole) -- |
| 7 | 46 | "EXAMPLE VIII;p" should read -- EXAMPLE VIII -- |

UNITED STATES PATENT OFFICE
CERTIFICATE OF CORRECTION

Patent No. 4,131,553  Dated December 26, 1978

Inventor(s) C. Thomas West

It is certified that error appears in the above-identified patent and that said Letters Patent are hereby corrected as shown below:

| | | |
|---|---|---|
| 8 | 38 | "spot Dispersancy" should read -- Spot Dispersancy -- |
| 10 | 30 | "dispersantviscosity" should read -- dispersant-viscosity -- |
| 10 | 42 | "$NH_2[CH_2)_zNH)]_xH$" should read -- $NH_2[(CH_2)_zNH)]_x-H$ -- |
| 10 | 50 | "sufficient" should read -- sulfonic -- |

Signed and Sealed this

Fourteenth Day of August 1979

[SEAL]

Attest:

*Attesting Officer*

LUTRELLE F. PARKER
*Acting Commissioner of Patents and Trademarks*